United States Patent
Cull et al.

(10) Patent No.: US 11,900,828 B2
(45) Date of Patent: Feb. 13, 2024

(54) FISTULA CANNULATION SIMULATOR

(71) Applicants: UNIVERSITY OF SOUTH CAROLINA, Columbia, SC (US); PRISMA HEALTH—UPSTATE, Greenville, SC (US)

(72) Inventors: David L. Cull, Greenville, SC (US); Thomas B. O'Hanlan, Liberty, SC (US)

(73) Assignees: UNIVERSITY OF SOUTH CAROLINA, Columbia, SC (US); PRISMA HEALTH—UPSATE, Greenville, SC (US)

( * ) Notice: Subject to any disclaimer, the term of this patent is extended or adjusted under 35 U.S.C. 154(b) by 51 days.

(21) Appl. No.: 17/184,939

(22) Filed: Feb. 25, 2021

(65) Prior Publication Data
US 2021/0183268 A1     Jun. 17, 2021

Related U.S. Application Data

(62) Division of application No. 15/296,680, filed on Oct. 18, 2016, now abandoned.

(60) Provisional application No. 62/330,404, filed on May 2, 2016.

(51) Int. Cl.
    *G09B 23/28*        (2006.01)
    *G09B 23/34*        (2006.01)

(52) U.S. Cl.
CPC ........... *G09B 23/285* (2013.01); *G09B 23/34* (2013.01)

(58) Field of Classification Search
CPC .... G09B 23/285; G09B 23/30; G09B 23/303; G09B 23/34

USPC .................................................. 434/268, 272
See application file for complete search history.

(56) References Cited

U.S. PATENT DOCUMENTS

| | | | |
|---|---|---|---|
| 2,689,415 | A | 9/1954 | Haver |
| 2,704,897 | A | 3/1955 | Lade |
| 2,871,584 | A | 2/1959 | Poole |
| 2,995,832 | A | 8/1961 | Alderson |
| 3,226,846 | A | 1/1966 | Wood |
| 3,789,518 | A | 2/1974 | Chase |
| 4,182,054 | A | 1/1980 | Wise et al. |

(Continued)

FOREIGN PATENT DOCUMENTS

| | | |
|---|---|---|
| JP | 2013-246393 | 12/2013 |
| WO | WO 2016/028821 | 2/2016 |

OTHER PUBLICATIONS

Azura™. "Dialysis Access Care & Management" *Azura Vascular Care* (2021) pp. 1-5. https://www.azuravascularcare.com/medical-services/dialysis-access-management/.

*Primary Examiner* — Joseph B Baldori
(74) *Attorney, Agent, or Firm* — Dority & Manning, P.A.

(57) ABSTRACT

A cannulation simulation device and methods for using the device are described. The device is designed to teach dialysis technicians/nurses or patients to cannulate arteriovenous (AV) fistulas for hemodialysis. The simulator includes one or more artificial fistulas. The simulator includes a pad of simulated flesh that can cover the artificial fistula(s). The pad can be reversed, rotated, and replaced with thicker or thinner pads. A personal simulation device for teaching self-cannulation can include a sleeve for a limb that can carry an artificial fistula. A clinical simulation device can include a plurality of artificial fistulas held in a support. Optionally, the artificial fistulas can vibrate to simulate an actual fistula.

16 Claims, 4 Drawing Sheets

(56) References Cited

U.S. PATENT DOCUMENTS

| | | | |
|---|---|---|---|
| 4,481,001 A * | 11/1984 | Graham | G09B 23/285 |
| | | | 434/267 |
| 5,112,228 A | 5/1992 | Zouras | |
| 5,215,469 A | 6/1993 | Kohnke et al. | |
| 5,775,916 A | 7/1998 | Cooper et al. | |
| 5,839,904 A | 11/1998 | Bloom | |
| 5,947,744 A | 9/1999 | Izzat | |
| 7,306,465 B2 | 12/2007 | White | |
| 7,534,107 B2 | 5/2009 | Bardsley et al. | |
| 7,665,995 B2 | 2/2010 | Toly | |
| 7,866,984 B1 | 1/2011 | Jawalekar | |
| 7,988,451 B2 | 8/2011 | Battaglia et al. | |
| 8,403,674 B2 * | 3/2013 | Feygin | G09B 23/285 |
| | | | 434/262 |
| 8,408,920 B2 | 4/2013 | Speller | |
| 8,556,635 B2 | 10/2013 | Toly | |
| 8,690,580 B2 | 4/2014 | Paronen | |
| 8,702,431 B2 | 4/2014 | Ikeno et al. | |
| 8,784,111 B2 | 7/2014 | Feygin et al. | |
| 9,033,713 B2 | 5/2015 | Nelson et al. | |
| 9,558,678 B1 | 1/2017 | Nerney | |
| 2004/0126746 A1 | 7/2004 | Toly | |
| 2011/0040262 A1* | 2/2011 | Cull | A61B 17/0057 |
| | | | 604/272 |
| 2011/0200977 A1 | 8/2011 | Paronen | |
| 2011/0256519 A1 | 10/2011 | Park et al. | |
| 2013/0052626 A1 | 2/2013 | Hoskins | |
| 2013/0078603 A1 | 3/2013 | Yang et al. | |
| 2014/0180416 A1* | 6/2014 | Radojicic | G09B 23/28 |
| | | | 623/17.16 |
| 2014/0212864 A1 | 7/2014 | Rios et al. | |
| 2014/0272870 A1 | 9/2014 | Eichhorn et al. | |
| 2017/0213481 A1 | 7/2017 | Mourton et al. | |
| 2017/0301263 A1* | 10/2017 | Souter | G09B 23/30 |
| 2018/0158373 A1 | 6/2018 | Hendrickson et al. | |
| 2018/0218645 A1* | 8/2018 | Stump | G09B 23/28 |

\* cited by examiner

FISTULA CANNULATION SIMULATOR

CROSS REFERENCE TO RELATED APPLICATION

This application is a divisional application of U.S. patent application Ser. No. 15/296,680, having a filing date of Oct. 18, 2016, which claims filing benefit of U.S. Provisional Patent Application Ser. No. 62/330,404, having a filing date of May 2, 2016, both of which are incorporated herein by reference in their entirety.

BACKGROUND

To cannulate an arteriovenous (AV) fistula for hemodialysis, it is necessary to insert two large gauge (usually 15 g to 17 g) needles through a patient's skin and into a vessel having high blood flow rate. AV fistula cannulation is an almost entirely tactile skill that requires locating the AV fistula in the subcutaneous tissue and proper assessment of the fistula orientation and depth followed by accurate placement of the needle end within the lumen of the vessel. Fistulas are identified in practice by the tactile pressure difference of the vessel longitude and circumference and by local area vibration caused by the mixed venous and arterial blood flow. The procedure is performed in clinical settings by dialysis nurses and technicians and requires great skill in correctly identifying the proper location and orientation of the fistula, as well as obtaining proper needle insertion into the vessel lumen. Patients who opt for home dialysis treatment must learn how to perform this skill themselves, generally without any prior experience in vascular access.

To improve the dialysis capabilities of medical personnel, nurses and technicians are trained on simulators. Unfortunately, no such simulators exist that have been designed for patients to train for self-cannulation. Moreover, even existing simulators offer only limited training effectiveness. Typical existing cannulation simulators are formed in shapes that mimic human or animal body parts (e.g., arms) and include a fixed artificial fistula covered with an artificial flesh material. While the anatomical form of the simulators can add to the perceived realism of the devices, the fixed placement and materials of the components decreases realism. Repeated piercing of the surface material to access the artificial fistula fixed beneath the surface material can reveal previous students' attempt locations and decrease effectiveness of the training. Movement or replacement of the surface material can be carried out at added expense, but the gel-like artificial flesh can be difficult to replace and the replacement procedure can be messy if the simulator includes synthetic blood.

Due to such issues, the skills gained by use of existing simulators provide fairly limited proficiency in real-world application. Difficulties can arise following training not only due to the fixed, static nature of existing simulators but also because it is difficult to capture in existing training simulators the large degree of variation in fistula depth, orientation, skin thickness and size between patients that will be faced by clinicians.

Patients wishing to self-cannulate away from the clinical setting may have the opportunity to use existing simulators, but the insufficiencies described for clinical settings still apply. Currently, estimates show that only 0.8% of hemodialysis patients choose to engage in home treatment. However, it is commonly held that outcomes are better when patients choose home treatment and nephrologists prefer patients be on home dialysis. The major barrier to home dialysis is patient fear of needle sticks, but proper training could alleviate such fears. As technology improves and the pool of hemodialysis patients expands, this market is expected to grow, as will the need for better training options.

What is needed in the art are cannulation simulators that more closely mimic an AV fistula cannulation experience. For instance, a cannulation simulator that addresses the real-world variables that may be encountered by health-care workers during actual dialysis practice such as little or no visual cues as to the location of the fistula could be of great benefit. A cannulation simulator that provides for patients to safely train for self-cannulation that can closely represent an actual AV fistula cannulation experience would also be of great benefit.

SUMMARY

A cannulation simulation device is disclosed. The cannulation simulation device includes an artificial fistula that can include an upper barrier, a lower barrier, and an opening there between that simulates the lumen of a fistula blood vessel. The upper barrier can define a radial curvature and an axial length that can simulate the radial curvature and longitudinal length of a blood vessel. The lower barrier can include a conductive material, e.g., a metal. During use, the conductive material can be utilized to register the passage of the conductive tip of a needle tip and provide information with regard to the exit of the needle tip out of the fistula opening and through the lower barrier. This feature can be used to register to a trainee that the needle has passed out of the fistula opening.

An artificial fistula can be associated with a vibration motor and a controller. The controller can be utilized to vibrate an artificial fistula via the associated vibration motor. An artificial fistula can optionally include a sensor that can be in communication with the open lumen area of the artificial fistula and function to register and communicate the presence of a needle tip within the opening of the artificial fistula.

In one embodiment, a device can include a support surface that defines a plurality of cut-outs in the surface, and each cut-out can retain an artificial fistula therein.

A device can also include a pad that can be removably located over the upper barrier of an artificial fistula. For instance, in one embodiment, a pad can be removably located on a support surface that defines a plurality of cut-outs in the surface. In this embodiment, the pad can cover all of the cut-outs and the artificial fistulas retained therein and can function as an artificial flesh over the fistulas. Optionally, a device can include several different pads of different thickness, compression characteristics, etc. so as to provide a different "feel" to the simulator surface and provide for cannulation simulations of a variety of difficulties.

In one embodiment, a support surface and a pad can both have a same surface area shape and size, such as a circle. As such, the pad can be removed, rotated and/or reversed, and replaced on the support surface to again fully cover the support surface and artificial fistulas. This can minimize the presence of visual and tactile cues on the pad that could designate the locations of the underlying fistulas and can extend the useful life of the pad.

In one embodiment, the support surface can rotate about an axis, which can be utilized to vary the location of the artificial fistulas underneath the pad and prevent memorization by trainees of fistula locations on a simulator.

According to another embodiment, a personal cannulation simulation device is disclosed. A personal cannulation simulation device can include a sleeve that is configured for temporary attachment to a subject; for instance, by having a shape that generally conforms to a human arm. In one embodiment, the sleeve can be of a closed and substantially cylindrical construction and can be configured to be slipped over the hand and onto the arm. In another embodiment, the sleeve can include an opening along a length of the sleeve and can include a closure. In this embodiment, a sleeve can be configured to wrap around an arm and optionally be held in place by use of the closure. A sleeve can be impenetrable to a needle (e.g., include a metal or a hard plastic) and can protect a wearer from accidental needle puncture during training.

A personal cannulation simulation device can also include an artificial fistula and a pad as described above. The artificial fistula can be between the sleeve and the pad, can be separable from the pad and/or sleeve, or of unitary construction with the pad and/or sleeve.

In one embodiment, a personal cannulation simulation device can include multiple removably attachable components so as to be assembled to mimic an individual's fistula depth, orientation, size, etc.

A cannulation simulation device can also include a flesh simulant material located on either side of the artificial fistula. The flesh simulant material can be a unitary component of a pad (e.g., the pad can include one or more channels of the flesh simulant material for location of the artificial fistula) or may be removably attachable to the pad, a sleeve, and/or the artificial fistula.

Also disclosed are methods for utilizing the cannulation simulation devices. For instance, following assembly of a device, a vibration motor can be turned on causing an artificial fistula to vibrate. A trainee (either a clinician or a patient) can then use tactile interaction to explore the upper surface of the pad and locate this vibrating artificial fistula. The trainee can then insert a dialysis needle into the fistula opening following determination of the direction and side edges of the fistula. Successful entrance of the needle tip into the fistula opening can be ascertained by use of sensors within the fistula openings. Should the trainee pass the needle tip through the fistula opening and out of a lower barrier of the artificial fistula, contact between the needle tip and a conductive surface on the lower barrier can be registered to signify that the needle tip has gone too far.

BRIEF DESCRIPTION OF THE DRAWINGS

A full and enabling disclosure of the present invention, including the best mode thereof, directed to one of ordinary skill in the art, is set forth in the specification, which makes reference to the appended figure, in which.

DETAILED DESCRIPTION

It is to be understood by one of ordinary skill in the art that the present discussion is a description of exemplary embodiments only, and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

A cannulation simulation device and methods for using the device are disclosed herein. The device can be used as an instructive instrument designed to teach dialysis technicians/nurses/patients to cannulate arteriovenous (AV) fistulas for hemodialysis. The simulator facilitates cannulation training by use of a more realistic experience as compared to existing cannulation simulators and can include real-time feedback to the trainee to indicate successful, as well as unsuccessful, cannulation of the lumen of the artificial fistula. Moreover, the simulator has been designed to provide for long life without development of visual or eidetic indicators as to the location of the artificial fistulas, so as to improve the capabilities of individuals trained by use of the device. While the present disclosure is primarily directed to description of arteriovenous cannulation, it will be readily understood by the person skilled in the art that the invention is not so limited but extends to techniques such as cannulation of arteriovenous grafts for hemodialysis.

Figure 1:
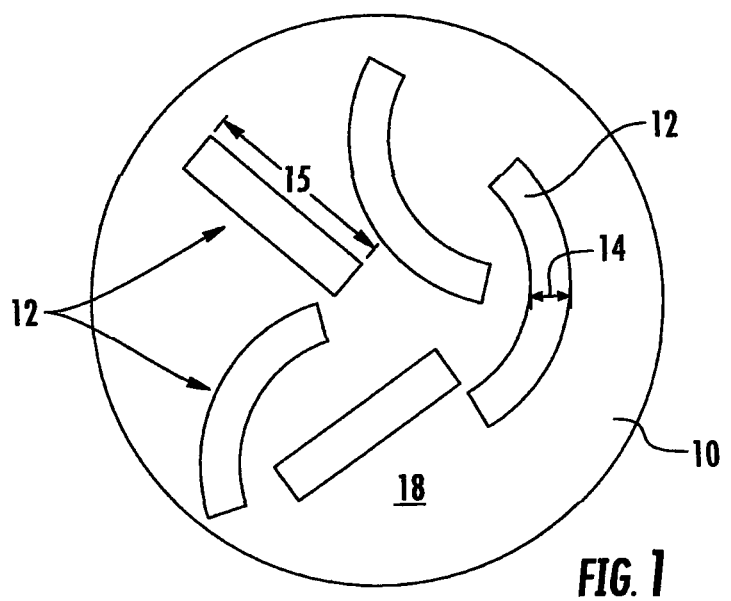
FIG. 1 is a top view of a support surface.
Figure 2:
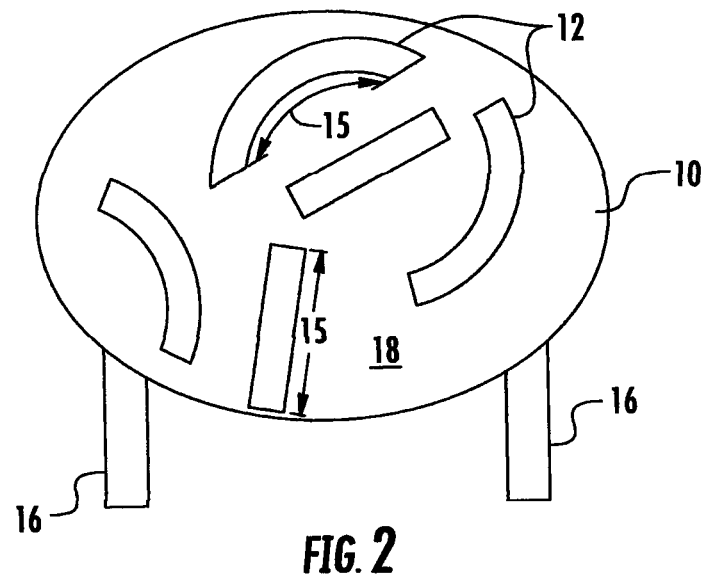
FIG. 2 is a perspective view of a support surface.

In one embodiment, the simulator comprises a support, multiple artificial fistulas held in various locations in conjunction with the support, and a removable pad of synthetic flesh overlaying the upper surface of the support and the artificial fistulas. By way of example, FIG. 1 illustrates a top view of a support 10 and FIG. 2 illustrates a perspective view of a support 10. The support 10 includes a series of cut-outs 12 within the support 10. The cut-outs 12 can generally have a cross-sectional dimension 14 of about 0.5 inches; for instance, from about 0.25 inches to about 1 inch. In addition, the cut-outs 12 can have a length 15 of several inches; for instance, from about 5 inches to about 12 inches or from about 7 inches to about 10 inches in some embodiments. As shown, the cut-outs 12 can define curvature(s) or can be generally straight along the length 15.

As shown in FIG. 2, the support 10 can be supported by legs 16. The legs 16 can be of any suitable length. For instance, the legs 16 can be designed such that the device can be held on a table or bench top, in which case the legs 16 can be relatively short, e.g., about 8 inches to about 14 inches, or about 12 inches in one embodiment. Alternatively, the device can be self-standing, in which case the legs 16 can be long enough (e.g., about 24 inches to about 40 inches) to locate the upper surface 18 of support 10 at a convenient height for use. In any case, the legs 16 can be of a height such that device components, e.g., wiring, controllers, motors, etc. can be retained beneath the support 10.

In general, the device can be portable. As such, the support 10 can generally be about 36 inches or less in width as measured from one side to an opposite side of the upper surface 18 of the support 10, e.g., from about 15 inches to about 24 inches in some embodiments. In addition, the support 10 and legs 16 can be formed of any suitable material, e.g., wood, plastic, or combinations of materials.

In the embodiment of FIG. 1 and FIG. 2, the support 10 has a generally round upper surface 18. The round surface 18 can be of benefit in some embodiments as by placing the artificial fistulas in conjunction with a round support 10, there can be few or no spatial reference points for students, ensuring that students will rely on tactile sensing to determine the location and the size of the target fistula held in conjunction with the support 10. A round upper surface 18 can also enable instructors to rotate and flip a flesh-simulation pad (described further herein) that is held on the upper surface 18 of the support 10 and has a size and shape that corresponds to the upper surface 18 of the support 10 while maintaining alignment between the upper surface 18 of the support 10 and the pad held thereon. This can prevent the formation of visual cues on the flesh-simulator pad that could indicate underlying fistula locations and can also extend the life of the flesh-simulator pad.

Figure 3:
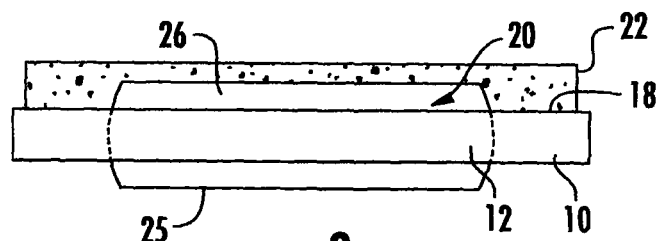
FIG. 3 is a side view of components of a cannulation simulator.

FIG. 3 presents a side-view of components of a device including a support 10, an artificial fistula 20 held in conjunction with the support 10, and a flesh-simulation pad 22 that can be removably located so as to align with the upper surface 18 of support 10 and can cover the artificial fistula 20.

The pad 22 can be a flesh-simulation material as is generally known in the art. For instance, the pad 22 can include an opaque gel-like or foam filler to simulate subcutaneous tissue and an outer cover to simulate skin. The pad 22 can generally be from about 0.5 inches to about 1 inch in total thickness. In one embodiment, the device can include multiple pads of varying thicknesses or various degrees of hardness (e.g., Shore A hardness) that can provide varying degrees of difficulty to a trainee. For instance, a relatively thin pad of about 0.5 inches can be used in an easier or beginning training session and a higher degree of difficulty can be obtained by substituting a thicker pad, e.g., about 1 inch, on the support 10. Alternatively, multiple thin pads can be combined to provide a more difficult simulation experience.

As mentioned previously, the temporary fixation of the pad 22 on the upper surface 18 of the support 10 can also be used to extend the life of the pad 22 and prevent the formation of visual cues on the pad 22 with regard to the location of the underlying fistula 20. In particular, the pad 22 can be lifted, rotated, and/or flipped and replaced on the upper surface 18 of the support 10. Beneficially, such changes can be carried out without creating a mess as the device need not include an artificial blood in the simulated flesh, as is the case for previously known cannulation simulators (though inclusion of an artificial blood in the device is certainly not prohibited). By changing the orientation of the gel pad the previous attempts at cannulation are obfuscated, preventing students from following needle marks to find a fistula. Further, the difficulty of the cannulation can be increased by increasing the thickness, density, and/or hardness of the pad 22, simulating difference in the depth and tenacity of the flesh.

Figure 4:
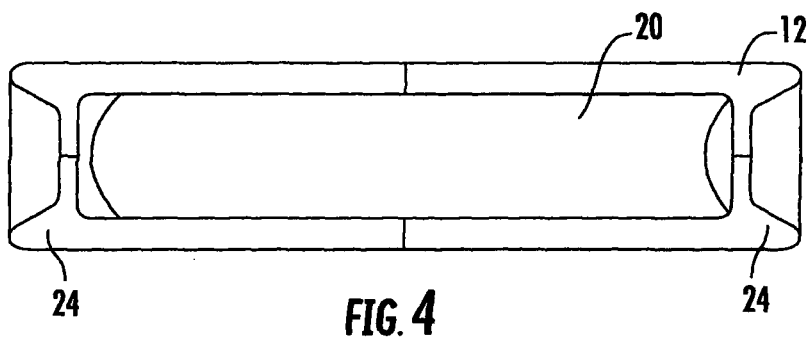
FIG. 4 is a top view of an opening of a support surface and an artificial fistula retained therein.

An artificial fistula 20 can be held in conjunction with each of the openings 12 in the support 10. FIG. 4 presents a top view of an artificial fistula 20 held in a cut-out 12. Each fistula 20 is suspended within a cut-out 12; for instance, by use of rubber bushings 24 and the like. The suspension mechanism can at least partially isolate the fistula 20 from the support 10 that surrounds the cut-out 12. As such, vibration of the fistula 20 can be better confined to the fistula and minimal vibration can transfer to the support 10. Partial isolation of the vibrations of the fistula 20 can better simulate the vibrations of an actual fistula in real-world practice.

Figure 5:
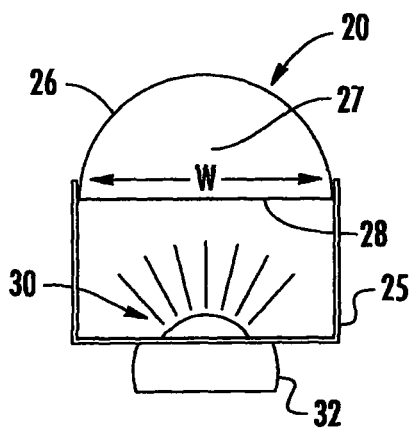
FIG. 5 is an end view of an artificial fistula.
Figure 6:
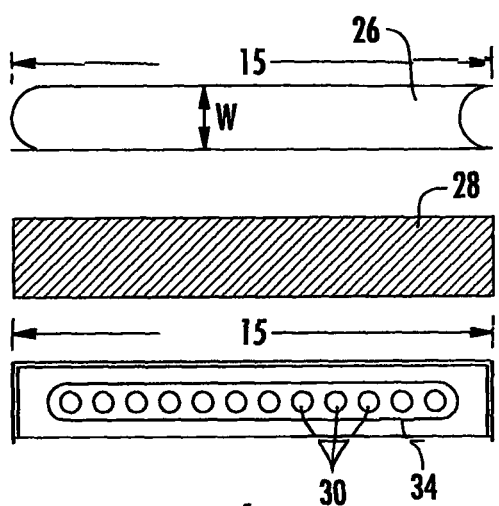
FIG. 6 illustrates several components of an artificial fistula.

FIG. 5 presents an end-view of an artificial fistula 20. The fistula 20 includes an upper barrier 26 and a lower barrier 28 that define a cannulation opening 27 there between. In the illustrated embodiment, the upper barrier 26 and the lower barrier 28 can be formed of different materials, but this is not a requirement of the devices. For instance, the upper barrier 26 can be a portion of a rubber or silicone tube that has a cross-sectional width w similar to that of a typical fistula. For instance, the side-to-side width (e.g., diameter) of the upper barrier 26 can be from about 6 millimeters to about 10 millimeters, or about 8 millimeters in one embodiment. The semi-circular cross-sectional shape of upper barrier 26 defining a radial curvature can also be beneficial as it can more closely resemble the shape of a natural fistula for the trainee. A fistula 20 can be held in a cut-out 12 such that a portion of the upper barrier 26 extends above the upper surface 18 of the support 10. For instance, the upper barrier 26 of a fistula 20 can protrude above the upper surface 18 of the support 10 by a distance of from about 2 millimeters to about 4 millimeters.

Figure 8:
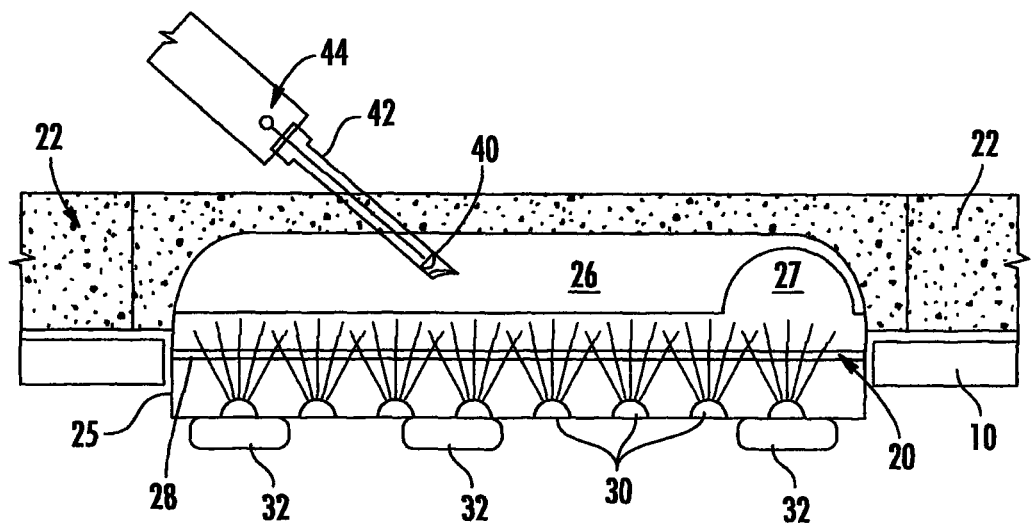
FIG. 8 illustrates a method of utilizing a cannulation simulator.

The lower barrier 28 can be of any suitable shape and material. In one embodiment, the lower barrier 28 can be formed of an electrically conductive material, such as a metal mesh. In this embodiment, penetration of the lower barrier 28 of the fistula 20 can be noted by a closed electrical circuit created between the conductive material of the lower barrier 28 and a conductive material of the needle tip. A signal (e.g., visual and/or auditory) can then be generated when the needle passes through the fistula opening 27 and makes physical contact with the charged mesh on the other side. Of course, alternatively, the electric signal generator and detector may be reversed, with the needle providing an electric potential and the mesh acting as a detector. As illustrated in FIG. 8, if the tip of the needle 42 passes through the opening 27 and through the lower barrier 28, a signal (e.g., an optical and/or auditory sound) can be emitted; signifying cannulation failure because the lower barrier 28 of the fistula 20 has been penetrated. For instance, the signal can be generated when the metal tip of the needle 42 contacts the charged wire mesh forming the lower barrier 28 of the fistula 20.

Referring again to FIG. 5, the fistula 20 can include a cradle 25 that can be utilized to suspend the fistula 20 in a cut-out 12 of a support 10 and to support the other components of the fistula 20, including the upper barrier 26 and the lower barrier 28, as shown.

Figure 7:
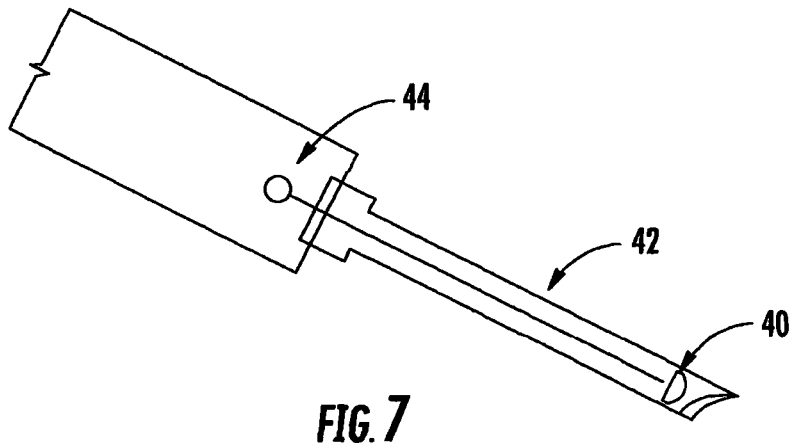
FIG. 7 illustrates a fistula needle and hub.

The cradle 25 can also support a component of a sensor 30 that can be utilized to detect successful penetration of the tip of a needle 42 into the opening 27. By way of example, the cradle 25 can support a strip 34 of IR-light emitting diodes (LEDs) 30 spaced along the length 15 of the fistula 20 that radiate emission within the opening 27. Proper positioning of a cannulation needle 42 with the tip within the opening 27 of the simulated fistula 20 can be determined by an infrared (IR) detector 40 (FIG. 7) attached to the needle 42 that can detect emission from the IR-LEDs 30 placed beneath the fistula opening 27 in the cradle 25. The emission from the IR-LEDs 30 cannot permeate beyond the fistula opening 27 as the upper barrier 26 and the overlying pad 22 can be opaque. When the tip of the needle 42 pierces the upper barrier 26, the detector 40 can create a signal upon detection of the IR emission from the IR-LEDs 30. For example, the detector 40 in the end of the cannulation needle 42 can create a signal 44 (e.g., optical and/or auditory signal) when the student successfully inserts the needle tip within the cannulation opening 27 of the fistula 20.

Of course, the detection method is not limited to IR and other optical or other detection systems may be utilized. Moreover, the location of the various sensor components may be reversed. For instance, an IR-LED can be attached to the tip of a fistula needle, and an IR detector can be located under or within the fistula opening. Missed cannulations of the fistula can thus be noted by the absence of a signal generation by the IR detector.

In the real-world cannulation of a fistula, the proper alignment of a needle in a vessel is evidenced by the "flashback" of blood within the IV tubing of the cannulation set that includes a large gauge needle, IV tubing with connectors, and flow arrestor. Previously known simulation systems include tubes filled with simulated blood that are connected to external reservoirs, allowing the simulator to "bleed." Cannulated synthetic veins in such systems can continue to leak between simulations and can lead to wet, messy simulators as the artificial blood will not coagulate a puncture as would living tissue. The presently disclosed systems can avoid such problems as proper cannulation of a fistula can be determined by signal generation without the need for synthetic blood.

Signals generated or received by the cannulation needle can be used to generate an indication for immediate user feedback, an indication only revealed to the instructor, and/or a recording of the trainee's attempts. These indications can be of any type, e.g., visual, tactile, and/or auditory, and recordings can be catalogued by computer program.

In addition to other components, a device can include vibration motors 32 in communication with each of the artificial fistulas 20. For example, one or more vibration motors 32 can be in mechanical communication with a cradle 25 or some other component of each fistula 20 so as to vibrate the upper barrier 26 of the fistula 20 and provide a tactile cue through the pad 22 to a trainee of the location, width, and direction of the underlying fistula 20.

Any suitable vibration motor 32 is encompassed, such as those commonly found in cell phones that can be used to mimic the vibrations of fistula. The vibration motor(s) 32 can be in communication with a control system (not shown) as is known in the art. Each motor 32 can be separately controlled or, alternatively, multiple motors 32 can be in communication with a single controller. For instance, multiple vibration motors 32 of a single fistula 20 can be controlled together. As shown in FIG. 8, in one embodiment, a series of vibration motors 32 can be located beneath the fistula opening 27; for instance, in mechanical communication with the cradle 25 of a fistula 20. During use, the vibration motor(s) 32 of only one fistula 20 of the device can be activated at a time to denote a single fistula that the trainee will then attempt to locate and cannulate. This is not a requirement, however, and in other embodiments, multiple fistulas can be activated at one time.

According to one embodiment, a simulator can be designed as a personal simulation device for use in training a patient for self-cannulation. According to this embodiment, a simulator can include a support in the form of a removable sleeve that is held in conjunction with a single artificial fistula. Similar to the multiple-fistula device described above, a personal simulation device can also include a pad of synthetic flesh overlaying the upper surface of the sleeve and the artificial fistula.

Figure 9:
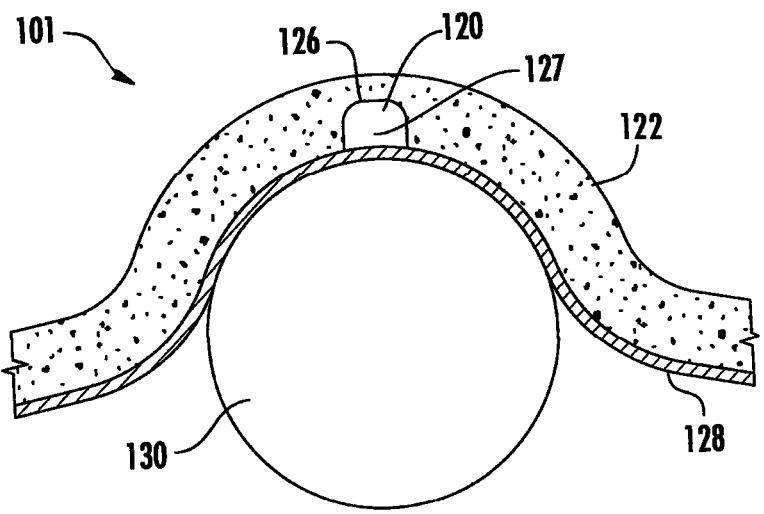
FIG. 9 illustrates a personal cannulation simulator in cross section.

One embodiment of a personal simulation device 101 is illustrated in FIG. 9. As shown, a simulation device 101 can include a sleeve 128 as a support for the artificial fistula. In one embodiment, a portion of the sleeve 128 can function as a lower barrier for the artificial fistula 120. In other embodiments, the lower barrier can be applied to the sleeve 128 during assembly. In the cross-sectional view of FIG. 9, the device is illustrated as covering a portion of a patient's limb 130, e.g., a forearm, leg, etc.

The sleeve 128 can be of a material that can prevent puncture by the trainee (generally a person wearing the device on their limb 130) with the training needle. For instance, the sleeve 128 can include a metal or a relatively hard plastic (e.g., a polyvinyl chloride, a polypropylene, etc.). The sleeve can be formed so as to be pulled over or wrapped around a patient's limb. For instance, one embodiment of a sleeve can be in the form of a generally cylindrical tube that can slide over a wearer's hand and into place on the limb. In another embodiment, the sleeve is not in the form of a closed tube, but rather, is open along the length of the cylinder. In this embodiment, the sleeve can be wrapped around the arm. Optionally, and depending upon the flexibility of the sleeve material, etc., a sleeve can include a closure such as a buckle, snap, button, or other commonly used securing techniques. As such, following location around a patient's limb, the sleeve can be secured in place. Currently available products on the market may also be used as a sleeve of a simulation device such as, without limitation, the Needle Resistant Arm Sleeves AG8TW by HexArmor®. Optionally, the sleeve 128 can include a conductive material, such as a metal mesh as described above, for the lower barrier so as to aid in training when a portion of the sleeve serves as the lower barrier of the artificial fistula.

A personal fistula cannulation simulation device 101 can include an artificial fistula 120 that includes an upper barrier 126 as described previously and a portion of the sleeve 128 as a lower barrier that define a cannulation opening 127 there between. Alternatively, the lower barrier can be formed of a different material that is applied to the sleeve. For instance, in one embodiment, the upper and lower barriers can be formed from a unitary tube that is assembled on the sleeve 128. The artificial fistula 120 can generally be of a size and shape as described previously.

A personal simulation device 101 can optionally include penetration sensors and vibrational components as described above for a larger, clinical-type device. For instance, a device 101 can be electrically connectable to a motor as described above that can vibrate all or a portion of the upper barrier 126 or a portion of the sleeve 128 so as to provide a vibration in the area of the artificial fistula 120 similar to what will be encountered by the patient during self-cannulation.

In one embodiment, a personal simulation device can include separable components that can provide for the device to be personalized for a user. For instance, the artificial fistula 120 can be separable from the sleeve 128 so as to be securable thereto in a variety of orientations. During formation, a technician that is familiar with a patient's fistula can locate the artificial fistula 120 on the sleeve 128 so as to mimic the orientation of the patient's actual fistula. Placement can be carried out with temporary attachment, for instance by use of a temporary adhesive or hook and pile attachments (e.g., Velcro®) or alternatively by use of a more permanent adhesive.

The personal device 101 can also include a pad 122 that can cover the artificial fistula and function as a flesh simulation. For instance, the pad can have a thickness of from about 0.25 inches to about 1 inch and be formed of materials as discussed previously.

In order to create a generally uniform upper surface on the device 101 and thereby offer minimal tactile cues as to the location of the fistula below the flesh simulant pad, a device can provide for the artificial fistula 120 to be generally surrounded on the top and sides with an artificial flesh such as the pad 122. For instance, the pad 122 can be formed with a channel or cavity within which the artificial fistula 122 can be located. Alternatively, multiple pieces of pad materials can be located on the sleeve 128 so as to surround the artificial fistula 120 and provide a uniform upper surface with little or no visual cues as to the location of the underlying fistula 120.

The channel or cavity formed in a pad 122 that can be adjacent to the top and sides of the fistula 120 may be formed by the manufacturer or may be custom designed by a nurse/technician removing material from a pad 122 to mimic a patient's specific fistula orientation. The pad 122 with imbedded artificial fistula 120 can then be located on the sleeve 128.

Figure 10:
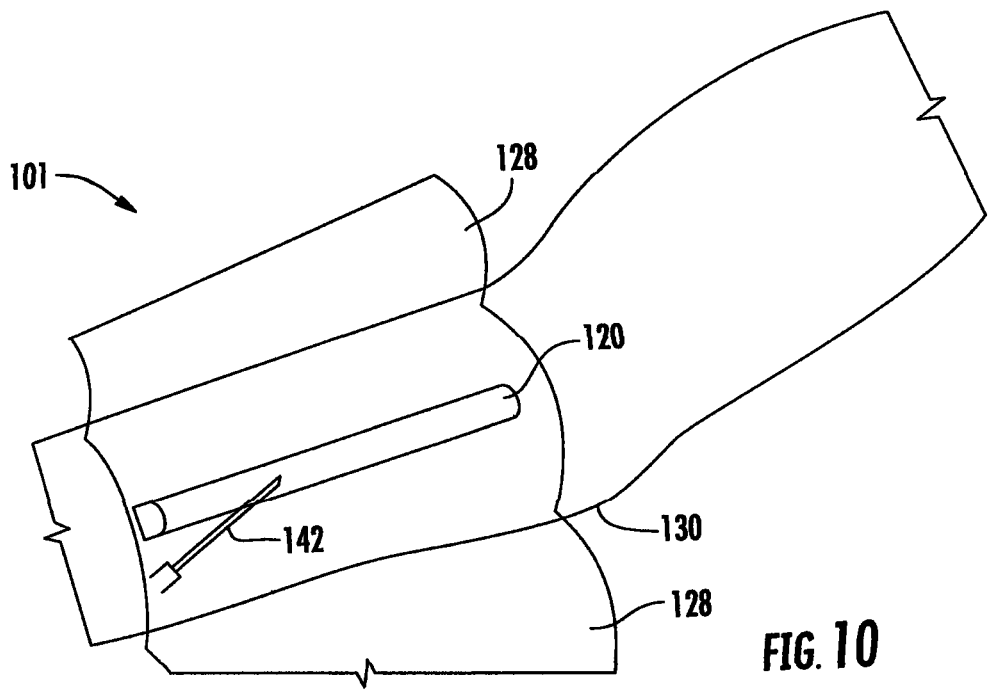
FIG. 10 illustrates a personal cannulation simulator located on an arm.

FIG. 10 illustrates a perspective view of a personal simulation device 101 following location on a patient's limb 130. As can be seen, in this embodiment, the sleeve 128 can be formed so as to be wrapped around the limb 128, following which it can be secured with buckles, snap closures, buttons, hook and loop closure, or other commonly-used temporary securing techniques. A sleeve 128 that is open along the side and includes a closure that can be preferred in some embodiments, as this can provide for a device with a variable cross-sectional size.

As shown, during use, a trainee can target a needle 142 to the artificial fistula 120. In the illustrated embodiment, the pad 122 is not shown. In one embodiment, during use, a trainee can locate the device on their own limb and over their own fistula. The trainee can then be taught to locate the artificial fistula 120 that lies beneath the pad by tactile exploration of the pad following which the trainee can be taught to penetrate the pad with a needle 142 and successfully locate the tip of the needle within the lumen 127 of the artificial fistula 120.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for cannulation training comprising:
providing a support, a pad being removably held thereon the support, and an artificial fistula held in conjunction with the support, the pad overlying on the artificial fistula and preventing visual cues with regard to the location of the underlying artificial fistula on the support, the artificial fistula including an upper barrier having a radial curvature and an axial length and further including a lower barrier defining a flat bottom, the artificial fistula defining a lumen between the upper barrier and the lower barrier, wherein the upper barrier and lower barrier together comprise a semi-circular cross-sectional shape, wherein the upper barrier of the artificial fistula protrudes from an upper surface of the support by a distance from about 2 millimeters to about 4 millimeters, wherein the side-to-side width of the upper barrier ranges from 6 millimeters to 10 millimeters, wherein the lower barrier comprises an electrically conductive material, wherein the electrically conductive material is a metal mesh;
inserting a dialysis needle through the pad, wherein the dialysis needle comprises a needle tip comprising an electrically conductive material;
passing the dialysis needle through the upper barrier;
detecting the presence of the dialysis needle within the lumen of the artificial fistula by use of a first sensor in communication with the lumen or detecting cannulation failure upon the tip of the dialysis needle passing through the lower barrier of the artificial fistula; and
engaging a vibration motor in communication with the artificial fistula such that the upper barrier of the artificial fistula vibrates whenever the vibration motor is selectively activated.

2. The method of claim 1, wherein the first sensor is in optical communication with the lumen.

3. The method of claim 2, wherein the first sensor comprises a strip of light-emitting diodes spaced along the axial length of the artificial fistula.

4. The method of claim 3, wherein the dialysis needle comprises an infrared detector.

5. The method of claim 4, wherein the dialysis needle comprises an infrared detector.

6. The method of claim 3, wherein the lower barrier allows for light emitted by the strip of light-emitting diodes to penetrate through the lower barrier such that the first sensor is in optical communication with the lumen.

7. The method of claim 1, the method further comprising detecting contact of the dialysis needle with the lower barrier.

8. The method of claim 7, wherein the contact is detected by formation of an electrical contact between the dialysis needle and the lower barrier thereby forming a closed electrical circuit between the dialysis needle and the lower barrier.

9. The method of claim 1, wherein the pad overlays a plurality of artificial fistulas, the method comprising engaging the vibration motor such that the upper barrier of only one of the plurality of artificial fistulas vibrates.

10. The method of claim 1, wherein the pad overlays a plurality of artificial fistulas, the method further comprising reorienting the pad from a prior orientation prior to inserting the dialysis needle, wherein reorienting comprises rotating, reversing, or replacing the pad.

11. The method of claim 1, wherein the pad defines a thickness of about 0.5 inches.

12. The method of claim 1, wherein the pad is a first pad, wherein the method further comprises replacing the first pad with a second, thicker or thinner pad or replacing the first pad with a plurality of pads.

13. The method of claim 12 further comprising modifying the difficulty of cannulation training by replacing the first pad with the second pad or replacing the first pad with the plurality of pads.

14. The method of claim 1, wherein the artificial fistula comprises a cradle that suspends the artificial fistula in the support.

15. The method of claim 14, wherein the cradle supports the first sensor beneath the lower barrier such that the first sensor is configured to detect penetration of a tip of the dialysis needle.

16. The method of claim 1, wherein the dialysis needle comprises a gauge ranging from 15 g to 17 g.

\* \* \* \* \*